(12) United States Patent
Zhong et al.

(10) Patent No.: US 11,579,162 B2
(45) Date of Patent: Feb. 14, 2023

(54) APPARATUS AND METHOD FOR MEASURING ROTATIONAL SPEED OF ROTARY SHAFT BASED ON VARIABLE DENSITY SINUSOIDAL FRINGE

(71) Applicant: FU ZHOU UNIVERSITY, Fujian (CN)

(72) Inventors: Shuncong Zhong, Fujian (CN); Jianfeng Zhong, Fujian (CN); Qiukun Zhang, Fujian (CN)

(73) Assignee: FU ZHOU UNIVERSITY, Fuzhou (CN)

( * ) Notice: Subject to any disclaimer, the term of this patent is extended or adjusted under 35 U.S.C. 154(b) by 658 days.

(21) Appl. No.: 16/075,689

(22) PCT Filed: Nov. 6, 2017

(86) PCT No.: PCT/CN2017/109514
§ 371 (c)(1),
(2) Date: Aug. 6, 2018

(87) PCT Pub. No.: WO2018/095213
PCT Pub. Date: May 31, 2018

(65) Prior Publication Data
US 2019/0041420 A1 Feb. 7, 2019

(30) Foreign Application Priority Data
Nov. 23, 2016 (CN) .......................... 201611038242.5

(51) Int. Cl.
*G01P 3/38* (2006.01)
*G06K 9/52* (2006.01)
(Continued)

(52) U.S. Cl.
CPC .............. *G01P 3/38* (2013.01); *G06K 9/2054* (2013.01); *G06K 9/3216* (2013.01); *G06K 9/468* (2013.01);
(Continued)

(58) Field of Classification Search
CPC ..... G01L 3/12; G01P 1/00; G01P 3/42; G01P 3/486; G01P 3/56; G01P 3/38;
(Continued)

(56) References Cited

U.S. PATENT DOCUMENTS 7,322,250 B1 * 1/2008 Discenzo ................ G01L 1/241
73/800
2016/0110628 A1 4/2016 Hwang et al.
2016/0356630 A1 * 12/2016 Huang .................. H02N 2/021

FOREIGN PATENT DOCUMENTS

CN      2410643 Y    12/2000
CN   201489014 U     5/2010
(Continued)

*Primary Examiner* — Luke D Ratcliffe
(74) *Attorney, Agent, or Firm* — Bayramoglu Law Offices LLC

(57) ABSTRACT

The present invention provides a shaft rotational speed measurement device and method based on variable density sinusoidal fringe pattern. The device comprises a variable density sinusoidal fringe pattern sensor, a high speed image acquisition and transmission module, a computer, and an image processing software module. The method comprises the following steps: make the variable density sinusoidal fringe pattern sensor attached on the circumferential surface of the measured shaft, the variable density sinusoidal fringe pattern sensor is continuously imaged and recorded by the high speed image acquisition module, the image transmission module transfers the fringe pattern signal to the computer, the image processing software module carries out Fourier transform to the fringe pattern signal in the same position of each frame, and corrects the peak frequency (Continued)

accurately by using the peak frequency correction method to obtain the accurate fringe pattern density information of each frame, obtains the time domain curve of the rotational angular velocity of the measured shaft, and then calculate the rotational speed of the measured shaft through the rotational angular velocity and sampling frequency. The present invention can realize non-contact measurement of rotational speed of measured shaft within a certain speed range, and the measuring device is simple, the measuring method is fast and accurate.

9 Claims, 1 Drawing Sheet

(51) Int. Cl.
*G06K 9/32* (2006.01)
*G06K 9/46* (2006.01)
*G06K 9/20* (2006.01)
*G01S 11/12* (2006.01)

(52) U.S. Cl.
CPC .............. *G06K 9/522* (2013.01); *G01S 11/12* (2013.01); *G06K 2209/19* (2013.01)

(58) Field of Classification Search
CPC .......... G01H 1/00; G01H 9/00; G06K 9/2054; G06K 9/3216; G06K 9/468; G06K 9/522; G06K 2209/19; G01S 11/12
See application file for complete search history.

(56) References Cited

FOREIGN PATENT DOCUMENTS

| CN | 101986103 | A | 3/2011 |
|---|---|---|---|
| CN | 105841620 | A | 8/2016 |
| CN | 205642604 | U | 10/2016 |
| CN | 106443046 | A | 2/2017 |
| CN | 206583924 | U | 10/2017 |

* cited by examiner

APPARATUS AND METHOD FOR MEASURING ROTATIONAL SPEED OF ROTARY SHAFT BASED ON VARIABLE DENSITY SINUSOIDAL FRINGE

BACKGROUND OF THE INVENTION

1. Technical Field

The present invention relates to the field of rotation measurement by using optical technology, and in particular to shaft rotational speed measurement device and method based on variable density sinusoidal fringe pattern.

2. Description of the Related Art

The measurement of rotational speed and rotational angle plays a very important role in some engineering fields, such as the rotational speed measurement of rotating devices like pump and motor. The status information of these rotating devices can be obtained by measuring the rotation parameters and can be used for machine condition monitoring and fault diagnosis. For example, the bearing of shaft is a key part for rotating devices, where local damage of bearing may occur during the long-period running, such as the abrasion of the inner ring, outer ring or roller of the bearing. This kind of damage causes internal shock or pulse vibration, from which the local damage information can be obtained by analyzing the characteristic signal of the instantaneous rotational speed of the bearing.

Currently, the shaft rotational speed measurement technique is mainly divided into three types: mechanical measurement techniques, electrical measurement techniques and optical measurement techniques. In mechanical measurement techniques, the measurement of rotational speed and angle could be realized by using the multi-disk gear wheel as the mechanical tachometer that installed on the shaft. The installation of the additional structures on the rotating device causes inconvenience in measurement as well as increases investment in equipment. In electrical measurement techniques, the measurement of rotational speed and angle could be realized by using electrostatic sensor or magnetic induction sensor based on magnetoresistive effect, which may introduce electromagnetic interference. In recent years, the vision-based measurement technique developed rapidly with the development of image sensor manufacturing technology, which has advantage of high efficiency, non-contact and introducing no additional mass. The vision-based rotational speed measurement methods proposed by researchers are mainly realized by using tracking algorithm and feature matching algorithm to obtain the rotational information between two different image frames, whose measurement speed and accuracy largely depends on the speed and accuracy of the image matching algorithm. In addition, it is need to acquire the whole image information of the measured object for local features tracking or matching. The wide range acquisition not only makes the imaging system more burdens, but also put forwards higher requirements for the transmission rate of the imaging system.

On the basis of the knowledge and study of the existing rotational speed measurement methods, it is of great significance to design an accurate, simple and efficient non-contact rotational speed measurement device and method, which can achieve real-time measurement of rotational angle and rotational speed without increasing the hardware cost of measurement system that based on machine vision.

BRIEF SUMMARY OF THE INVENTION

To overcome the defects mentioned above, the present invention provides a simple, high-speed and precision shaft rotational speed measurement device and method based on variable density sinusoidal fringe pattern, which can realizes non-contact measurement for rotating shaft within a certain speed range.

A shaft rotational speed measurement device based on variable density sinusoidal fringe pattern comprises the following components:

a variable density sinusoidal fringe pattern sensor which is attached on the circumferential surface of the measured shaft for encoding the angular position of the shaft, a high speed image acquisition and transmission module which is used for continuously imaging and recording the variable density sinusoidal fringe pattern sensor as well as transmitting the fringe pattern signal of the variable density sinusoidal fringe pattern sensor to a computer, a computer which is used for controlling the high speed image acquisition and transmission module as well as storing and processing the fringe pattern signal that transmitted from the high speed image acquisition and transmission module, and an image processing software module that installed in the computer and used for processing the fringe pattern signal to obtain the rotational angle and speed of the measured shaft as well as making further analyzing and processing of the obtained rotational speed signals to realize condition monitoring and fault diagnosis of the rotating machinery.

Furthermore, the variable density sinusoidal fringe pattern sensor attached to the circumferential surface of the measured shaft is a specially designed lightweight sticker, whose front face is the fringe pattern and the back is a sticker layer.

Furthermore, the variable density sinusoidal fringe pattern sensor is a rectangular lightweight sticker, whose front face is sinusoidal fringe pattern with linear density changes along the length direction, and whose length is, equal to the circumference of the measured shaft. The rectangular variable density sinusoidal fringe pattern sensor is attached to the circumferential surface of the measured shaft along the length direction before measuring in order to encode the rotational angle of the measured shaft.

Furthermore, the different fringe pattern density of the variable density sinusoidal fringe pattern sensor corresponds to the different rotational angles of the measured shaft within $0$-$2\pi$, and the rotational angles of the measured shaft is obtained by calculating the fringe pattern density.

Furthermore, the high speed image acquisition and transmission module comprises a high speed image acquisition module and a high speed image transmission module, wherein the high speed image acquisition module comprises an imaging sensor and an optical imaging lens, and the high speed image transmission module comprises a data transmission module which is a data line.

Furthermore, the acquisition frame rate of the high speed image acquisition module and the acquisition range of the imaging sensor are adjustable. The high speed image acquisition module is placed in front of the surface of the measured shaft and perpendicular to the axis of the measured shaft, so that the variable density sinusoidal fringe pattern sensor can be imaged in the middle position of the imaging sensor.

Furthermore, the imaging sensor comprises linear-array imaging sensor and area-array imaging sensor. The linear-array imaging sensor can save the cost of the device.

Furthermore, the imaging range of the area-array imaging sensor is adjustable, the imaging width of the area-array imaging sensor is suitable for the width of the variable density sinusoidal fringe pattern sensor, and there are a row or several rows of pixels in the direction of the imaging length, which reduces the size of the imaged fringe pattern, increases the transmission frame rate and reduces storage space.

The present invention further provides a shaft rotational speed measurement method based on variable density sinusoidal fringe pattern. The shaft rotational speed measurement method comprises the following steps:

step S1, make the variable density sinusoidal fringe pattern sensor attached on the circumferential surface of the measured shaft, and adjust the image position of the high speed image acquisition module in order to make the fringe pattern of the variable density sinusoidal fringe pattern sensor can be imaged in the middle position of the imaging sensor of high speed image acquisition module, step S2, the variable density sinusoidal fringe pattern sensor attached to the circumferential surface of the measured shaft rotates with the measured shaft, during which the variable density sinusoidal fringe pattern sensor is continuously imaged and recorded by the high speed image acquisition module, wherein the position of the high speed image acquisition module is fixed, and the period density of the imaged fringe pattern of the imaging sensor changes as the rotational angle of the measured shaft changes, step S3, transfer the recorded fringe pattern sequence signals to the computer by the high speed image transmission module, and then process the fringe pattern sequence signals by the image processing software module, step S4, the image processing software module carries out Fourier transform to the fringe pattern signal in the same position of each frame, and corrects the peak frequency accurately by using the peak frequency correction method to obtain the accurate fringe pattern density information of each frame, step S5, the image processing software module obtains the time domain curve of the rotational angular velocity of the measured shaft by analyzing the mathematical relationship between the rotational angle and the fringe pattern density, and then calculates the rotational speed of the measured shaft by analyzing the rotational angular velocity and sampling frequency, and step S6, the computer displays the time domain curve of the rotational angular velocity and the rotational angle, and takes further processing and analysis of the time domain curve by using signal analysis program to realize the condition monitoring for rotating machinery.

Furthermore, the fringe pattern density of the variable density sinusoidal fringe pattern sensor varies linearly from $d_s$ to $d_e$, the mathematical relationship between the fringe pattern density $d_i$ and the rotational angle $\theta_i$ of frame i is $$\theta_i = \frac{2\pi}{d_e - d_s}(d_i - d_s),$$

the mathematical formula for the instantaneous angular velocity $\omega_i$ of the measured shaft of frame i is $$\omega_i = \frac{2\pi(d_i - d_{i-1})}{(d_e - d_s)\Delta t} = \frac{2\pi(d_i - d_{i-1})}{(d_e - d_s)}f_s,$$

and the mathematical formula for the instantaneous rotational speed $n_i$ of the measured shaft of frame i is $$n_i = \frac{60\omega_i}{2\pi} = \frac{60(d_i - d_{i-1})}{(d_e - d_s)}f_s,$$

wherein $\Delta t$ is the interval between two adjacent frames of the high speed image acquisition module, and $f_s$ is the corresponding sampling frequency of the high speed image acquisition module.

The fringe pattern density is obtained through dividing actual width W of the fringe pattern by accurating fringe pattern frequency.

The peak frequency correction method is energy centrobaric correction method, in which the normalized Hanning window function is added to the fringe pattern intensity signal firstly, and then the normalized frequency information of the fringe pattern is obtained by obtaining the energy center of the normalized power spectrum of the fringe pattern intensity signal that has added the window function, and the final formula for the normalized fringe pattern frequency is $$f_i^1 = \sum_{j=-z}^{z}(k+j)G_{k+j} \bigg/ \sum_{j=-z}^{z}G_{k+j},$$

in which $f_i^1$ is the normalized fringe pattern frequency of the frame i, $G_k$ is the maximum value of the discrete spectrum, k represents the kth discrete power spectrum line, $G_{k+j}$ is the value of the (k+1)th spectral line, and z is the number of spectral lines used for calculating the energy center.

The formula between the fringe pattern density of the ith frame $d_i$ and normalized fringe pattern frequency of the ith frame $f_i^1$ is $$d_i = f_i^1 N/W,$$

in which N is the number of pixels in the width direction of the fringe pattern image, W is the actual width of the fringe pattern.

Compared with the prior art, the present invention has the following beneficial effects:

1, According to the present invention, the rotational parameters of the measured shaft can be measured quickly. The present invention does not need to carry out complex sensor arrangement and system parameter adjustment like the mechanical measurement system, nor does it produce electromagnetic interference like the electrical measurement method.

2, According to the present invention, the non-contact speed measurement can be realized. Compared with the existing method of rotation shaft measurement based on image tracking and matching algorithm, there is no need to carry out a large number of image tracking and matching operations, which improves the computing speed of the system.

3, According to the present invention, the sampling data can be reduced greatly and the transmission frame rate can be improved. The existing method of measured shaft measurement based on image tracking and matching algorithm needs to collect the image information of the whole shaft, so that the tracking and matching of local characteristic signals can be carried out. Large-scale image acquisition not only makes the acquisition system more burdens, but also put forward higher requirements for the transmission of image signals. However, the present invention uses the fringe pattern density information to code the rotational angle of the measured shaft, which can realize parameter measurement of measured shaft by only one row of pixel information at least. The present invention can improve image transmission rate and system sampling frequency, as well as reduce image storage space.

BRIEF DESCRIPTION OF THE SEVERAL VIEWS OF THE DRAWINGS

The present invention is further described with the drawings as follows.

In the FIGS.: 1—computer, 2—data transmission module, 3—high speed image acquisition module, 4—optical imaging lens, 5—variable density sinusoidal fringe pattern sensor, 6—measured shaft, 7—fringe pattern signal, 8—area-array imaging sensor, 9—imaged sinusoidal fringe pattern signal.

DETAILED DESCRIPTION OF THE INVENTION

A further description of the present invention is given as follows with the drawings and specific embodiment.

Figure 1:
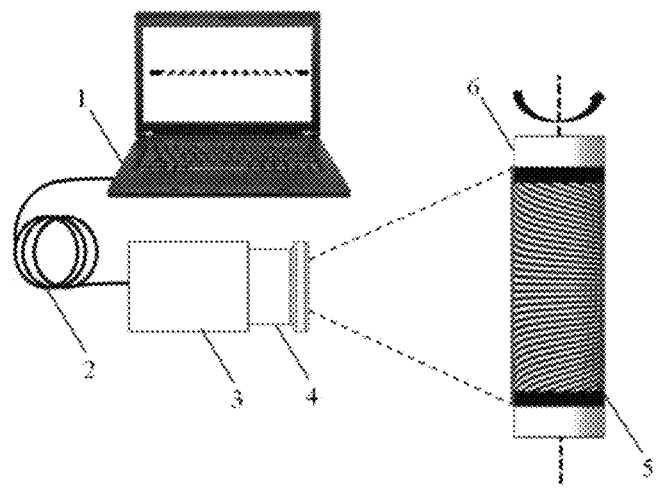
FIG. 1 is a schematic diagram of the device structure in one embodiment of the present invention.

As is shown in FIG. 1, this embodiment provides a shaft rotational speed measurement device based on variable density sinusoidal fringe pattern, which comprises a variable density sinusoidal fringe pattern sensor 5, a high speed image acquisition module 3, a data transmission module 2, a computer 1, an image processing software module, and a measured shaft 6. The variable density sinusoidal fringe pattern sensor 5 is attached on the circumferential surface of the measured shaft 6 for encoding the angular position of the measured shaft. The high speed image acquisition module 3 is used for continuously imaging and recording the variable density sinusoidal fringe pattern sensor 5 as well as transmitting the sinusoidal fringe pattern signal to the computer 1. The image processing software module which is installed in the computer 1 carries out Fourier transform to the fringe pattern signal of the same position in each frame, and corrects the peak frequency accurately by using the peak frequency correction method to obtain the accurate fringe pattern density information of each frame. The image processing software module obtains the time domain curve of the rotational angular velocity of the measured shaft by analyzing the mathematical relationship between the rotational angle and the fringe pattern density, and then calculates the rotational speed of the measured shaft by analyzing the rotational angular velocity and sampling frequency. At last, the computer displays the time domain curve of the rotational angular velocity and the rotational angle, and takes further processing and analysis of the time domain curve by using signal analysis program to realize the condition monitoring of rotating machinery.

Figure 2:
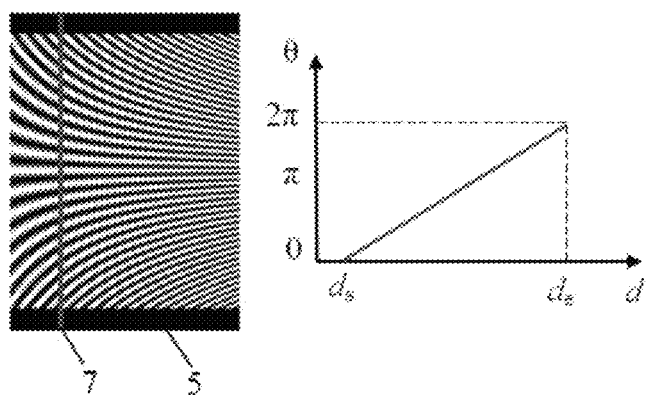
FIG. 2 is a schematic diagram of the variable density sinusoidal fringe pattern image and a schematic diagram of relationship between the fringe pattern density and the rotational angle in one embodiment of the present invention.

Furthermore, in this embodiment, as is shown in FIG. 2, the variable density sinusoidal fringe pattern sensor 5 is a rectangular lightweight sticker, whose front face is a sinusoidal fringe pattern with linear density changes along the length direction, and whose length is equal to the circumference of the measured shaft 6. The rectangular variable density sinusoidal fringe pattern sensor is attached to the circumferential surface of the measured shaft along the length direction before measuring, so that the variable density sinusoidal fringe pattern sensor 5 is completely attached to the circumferential surface of the measured shaft 6. The fringe pattern density of the variable density sinusoidal fringe pattern sensor varies linearly from $d_s$ to $d_e$, so that the different fringe pattern density of the variable density sinusoidal fringe pattern sensor corresponds to the different rotational angles of the measured shaft within 0-2π.

Furthermore, in this embodiment, in practical engineering measurements, the fringe pattern sensors can have different types which can be designed according to the characteristics of the structure. Also the fringe patterns can be painted or coated on the surface of the measured shaft. The present invention does not list all kinds of fringe pattern sensors nor all ways to make the fringe patterns, but all the measurements based on the invention belong to the scope of protection of the present invention.

Figure 3:
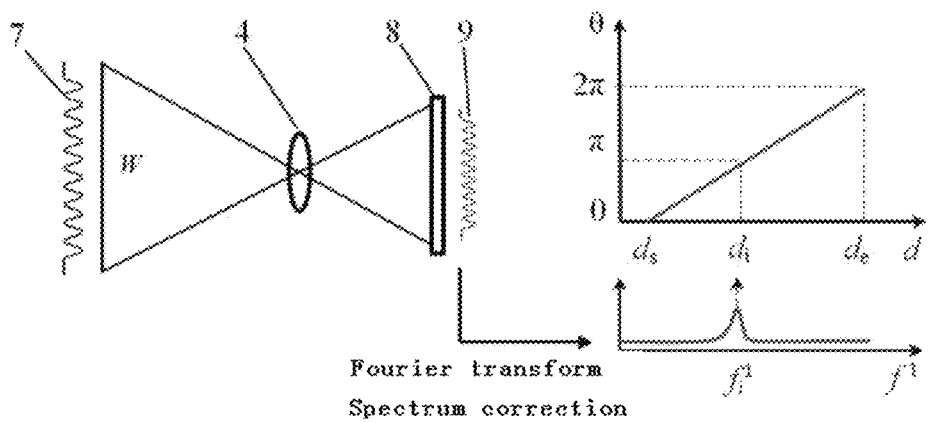
FIG. 3 is a schematic diagram of imaging geometric relationship of the high speed image acquisition module and image processing flow in one embodiment of the present invention.

Furthermore, as is shown in FIG. 3, in this embodiment, the high speed image acquisition module comprises an area-array imaging sensor 8 and an optical imaging lens 4. Make the variable density sinusoidal fringe pattern sensor 5 attached on the circumferential surface of the measured shaft 6, as well as adjust the image position of the high speed image acquisition module and focal length of the optical imaging lens in order to make the fringe pattern signal 7 of the variable density sinusoidal fringe pattern sensor can be imaged in the middle position of the imaging sensor 8. Set the imaging width of the area-array imaging sensor to be suitable for the width of the variable density sinusoidal fringe pattern sensor 5 and set a row or several rows of pixels in the direction of the imaging length in order to reduce the size of the imaged fringe pattern, increase the transmission frame rate and reduce storage space. The variable density sinusoidal fringe pattern sensor 5 attached to the circumferential surface of the measured shaft rotates with the measured shaft 6. The variable density sinusoidal fringe pattern sensor is continuously imaged and recorded by the high speed image acquisition module. The density of the imaged sinusoidal fringe pattern signal 9 changes as the rotation of the measured shaft. The rotational angle information can be obtained by calculating the density of the imaged sinusoidal fringe pattern signal 9, and then the rotational speed signal can be obtained by using the rotational angular velocity and sampling frequency.

Furthermore, this embodiment also provides a shaft rotational speed measurement method based on variable density sinusoidal fringe pattern, which comprises the following steps:

step S1, make the variable density sinusoidal fringe pattern sensor attached on the circumferential surface of the measured shaft, and adjust the image position of the high speed image acquisition module in order to make the fringe pattern of the variable density sinusoidal fringe pattern sensor can be imaged in the middle position of the imaging sensor of high speed image acquisition module, step S2, the variable density sinusoidal fringe pattern sensor attached to the circumferential surface of the measured shaft rotates with the measured shaft, during which the variable density sinusoidal fringe pattern sensor is continuously imaged and recorded by the high speed image acquisition module, wherein the position of the high speed image acquisition module is fixed, and the period density of the imaged fringe pattern of the imaging sensor changes as the rotational angle of the measured shaft changes, step S3, transfer the recorded fringe pattern sequence signal to the computer by the high speed image transmission module, and then process the fringe pattern sequence signals by the image processing software module, step S4, the image processing software module carries out Fourier transform to the fringe pattern signal in the same position of each frame, and corrects the peak frequency accurately by using the peak frequency correction method to obtain the accurate fringe pattern density information of each frame, step S5, the image processing software module obtains the time domain curve of the rotational angular velocity of the measured shaft by analyzing the mathematical relationship between the rotational angle and the fringe pattern density, and then calculates the rotational speed of the measured shaft by analyzing the rotational angular velocity and sampling frequency, and step S6, the computer displays the time domain curve of the rotational angular velocity and the rotational angle, and take further processing and analysis of the time domain curve by signal analysis program to realize the condition monitoring for rotating machinery.

Furthermore, the fringe pattern density of the variable density sinusoidal fringe pattern sensor varies linearly from $d_s$ to $d_e$, the mathematical relationship between the fringe pattern density $d_i$ and the rotational angle $\theta_i$ of frame i is $$\theta_i = \frac{2\pi}{d_e - d_s}(d_i - d_s),$$

wherein the mathematical formula for the instantaneous angular velocity $\omega_i$ of the measured shaft at the time of frame i is $$\omega_i = \frac{2\pi(d_i - d_{i-1})}{(d_e - d_s)\Delta t} = \frac{2\pi(d_i - d_{i-1})}{(d_e - d_s)} f_s,$$

wherein the mathematical formula for the instantaneous rotational speed $n_i$ of the measured shaft of frame i is $$n_i = \frac{60\omega_i}{2\pi} = \frac{60(d_i - d_{i-1})}{(d_e - d_s)} f_s,$$

in which $\Delta t$ is the interval between two adjacent frames of the high speed image acquisition module, and $f_s$ is the corresponding sampling frequency of the high speed image acquisition module.

The fringe pattern density is obtained through dividing actual width W of the fringe pattern by accurating fringe pattern frequency. The peak frequency correction method is energy centrobaric correction method, in which the normalized Hanning window function is added to the fringe pattern intensity signal firstly, and then the normalized frequency information of the fringe pattern is obtained by obtaining the energy center of the normalized power spectrum of the fringe pattern intensity signal that has added the window function, and the final formula for the normalized fringe pattern frequency is $$f_i^1 = \sum_{j=-z}^{z}(k+j)G_{k+j} \bigg/ \sum_{j=-z}^{z} G_{k+j},$$

in which $f_i^1$ is the normalized fringe pattern frequency of the frame i, $G_k$ is the maximum value of the discrete spectrum, k represents the kth discrete power spectrum line, $G_{k+j}$ is the value of the (k+1)th spectral line, and z is the number of spectral lines used for calculating the energy center. The formula between the fringe pattern density of the ith frame $d_i$ and normalized fringe pattern frequency of the ith frame $f_i^1$ is $$d_i = f_i^1 N/W,$$

in which N is the number of pixels in the width direction of the fringe pattern image, W is the actual width of the fringe pattern.

The purposes, technical scheme and advantages of the present invention are further described in detail with the preferred embodiment mentioned above. It would appreciate that the embodiment mentioned above is only one preferred embodiment of the present invention and is not used for limiting the present invention, and any modification, equivalent substitute and improvement made based on the spirit and principle of the present invention should fall within the protection scope of the present invention.

What is claimed is:

1. A shaft rational speed measurement device based on variable density sinusoidal fringe pattern, comprising:
a variable density sinusoidal fringe pattern sensor which is attached on the circumferential surface of an measured shaft for encoding the angular position of the measured shaft,
a high speed image acquisition and transmission module which is used for continuously imaging and recording the variable density sinusoidal fringe pattern sensor as well as transmitting a fringe pattern signal of the variable density sinusoidal fringe pattern sensor to a computer,
a computer which is used for controlling the high speed image acquisition and transmission module as well as storing and processing the fringe pattern signal that transmitted from the high speed image acquisition and transmission module, and
an image processing software module that installed in the computer and used for processing the fringe pattern signal to obtain the rotational angle and speed of the measured shaft as well as making further analyzing and processing of the obtain rotational angle and speed signal to realize condition monitoring and fault diagnosis of the rotating machinery;

wherein, the variable density sinusoidal fringe pattern sensor attached to the circumferential surface of the measured shaft is a specially designed lightweight sticker, whose front face is a variable density sinusoidal fringe pattern and the back is sticker layer.

2. The shaft rotational speed measurement device based on variable density sinusoidal fringe pattern according to claim 1, wherein the variable density sinusoidal fringe pattern sensor is a rectangular lightweight sticker, whose front face is sinusoidal fringe pattern with linear density changes along the length direction and whose length is equal to the circumference of the measured shaft;

wherein the variable density sinusoidal fringe pattern sensor is attached to the circumferential surface of the measured shaft along the length direction before measuring in order to encode the rotational angle of the measured shaft.

3. The shaft rotational speed measurement device based on variable density sinusoidal fringe pattern according to claim 2, wherein different fringe pattern density of the variable density sinusoidal fringe pattern sensor corresponds to the different rotational angles of the measured shaft which are between 0-2π, and the rotational angles of the measured shaft could be obtained by calculating the period density of the imaged fringe pattern.

4. The shaft rotational speed measurement device based on variable density sinusoidal fringe pattern according to claim 1, wherein the high speed image acquisition and transmission module comprises a high speed image acquisition module and a high speed image transmission module, wherein the high speed image, acquisition module comprises an imaging sensor and an optical imaging lens, and the high speed image transmission module comprises a data transmission module which is a data line.

5. The shaft rotational speed measurement device based on variable density sinusoidal fringe pattern according to claim 4, wherein the acquisition frame rate of the high speed image acquisition module and the acquisition range of the imaging sensor are adjustable; wherein the high speed image acquisition module is placed in front of the surface of the measured shaft and perpendicular to the axis of the measured shaft, so that the variable density sinusoidal fringe pattern sensor can be imaged in the middle position of the imaging sensor.

6. The shaft rotational speed measurement device based on variable density sinusoidal fringe pattern according to claim 4, wherein the imaging sensor comprises linear-array imaging sensor and area-array imaging sensor.

7. The shaft rotational speed measurement device based on variable density sinusoidal fringe pattern according to claim 6, wherein the imaging range of the area-array imaging sensor is adjustable, the imaging width of the area-array imaging sensor is suitable for the width of the variable density sinusoidal fringe pattern sensor, and there are a row or several rows of pixels in the direction of the imaging length in order to reduce the size of imaged variable density sinusoidal fringe pattern.

8. A shaft rotational speed measurement method based on variable density sinusoidal fringe pattern, wherein comprising the following steps:

step S1: make a variable density sinusoidal fringe pattern sensor attached on the circumferential surface of a measured shaft, and adjust the image position of a high speed image acquisition module in order to make the fringe pattern of the variable density sinusoidal fringe pattern sensor can be imaged in the middle position of the imaging sensor of high speed image acquisition module, step S2: the variable density sinusoidal fringe pattern sensor attached to the circumferential surface of the measured shaft rotates with the measured shaft, during which the variable density sinusoidal fringe pattern sensor is continuously imaged and recorded by the high speed image acquisition module, wherein the position of the high speed image acquisition module is fixed, and the period density of the imaged fringe pattern of the imaging sensor changes as the rotational angle of the measured shaft changes, step S3: transfer the recorded fringe pattern sequence signal to a computer by the high speed image transmission module, and then process the fringe pattern sequence signal by an image processing software module, step S4: the image processing software module carries out Fourier transform to the fringe pattern signal in the same position of each frame, and corrects the peak frequency accurately by using the peak frequency correction method, to obtain the accurate fringe pattern density information of each frame, step S5: the image processing software module obtains a time domain curve of the rotational angular velocity of the measured shaft by analyzing the mathematical relationship between the rotational angle and the fringe pattern density, and then calculates the rotational speed of the measured shaft by analyzing the rotational angular velocity and sampling frequency, and step S6: the computer displays the time domain curve of the rotational angular velocity and the rotational angle, and take further processing and analysis of the time domain curve by signal analysis program to realize the condition monitoring for rotating machinery.

9. The shaft rotational speed measurement method based on variable density sinusoidal fringe pattern according to claim 8, wherein the fringe pattern density of the variable density sinusoidal fringe pattern sensor varies linearly from d, to $d_e$, the mathematical relationship between the fringe pattern density $d_i$ and the rotational angle θ of frame i is $$\theta_i = \frac{2\pi}{d_e - d_s}(d_i - d_s),$$

wherein the mathematical formula for the instantaneous angular velocity $\omega_i$ of the measured shaft of frame i is $$\omega_i = \frac{2\pi(d_i - d_{i-1})}{(d_e - d_s)\Delta t} = \frac{2\pi(d_i - d_{i-1})}{(d_e - d_s)}f_s,$$

wherein the mathematical formula for the instantaneous rotational speed $n_i$, of the measured shaft of frame i is:

$$n_i = \frac{60\omega_i}{2\pi} = \frac{60(d_i - d_{i-1})}{(d_e - d_s)}f_s,$$

in which Δt is the interval between two adjacent frames of the high speed image acquisition module, and $f_s$, is the corresponding sampling frequency of the high speed image acquisition module, wherein the fringe pattern density is obtained through dividing actual width W of the fringe pattern by accurating fringe pattern frequency, wherein the peak frequency correction method is energy centrobaric correction method, in which the normalized Hanning window function is added to the fringe pattern intensity signal firstly, and then the normalized frequency information of the fringe pattern is obtained by obtaining the energy center of the normalized power spectrum of the fringe pattern intensity signal that has added the window function, and the final formula for the normalized fringe pattern frequency is $$f_i^1 = \sum_{j=-z}^{z} (k+j)G_{k+j} \bigg/ \sum_{j=-z}^{z} G_{k+j},$$

in which $f_i^1$ is the normalized fringe pattern frequency of the frame i, $G_k$ is the maximum value of the discrete spectrum, k represents the kth discrete power spectrum line, $G_{k+j}$ is the value of the (k+1)th spectral line, and z is the number of spectral lines used for calculating the energy center, wherein the formula between the fringe pattern density of the ith frame $d_i$, and normalized fringe pattern frequency of the ith frame $f_i^1$, is $$d_i = f_i^1 N/W,$$

in which N is the number of pixels in the width direction of the fringe pattern image, W is the actual width of the fringe pattern.

* * * * *